(12) United States Patent
Tatekawa

(10) Patent No.: US 10,416,459 B2
(45) Date of Patent: Sep. 17, 2019

(54) HEAD-UP DISPLAY APPARATUS

(71) Applicant: HYUNDAI MOBIS CO., LTD., Seoul (KR)

(72) Inventor: Tsutomu Tatekawa, Iwaki (JP)

(73) Assignee: HYUNDAI MOBIS CO., LTD., Seoul (KR)

( * ) Notice: Subject to any disclaimer, the term of this patent is extended or adjusted under 35 U.S.C. 154(b) by 62 days.

(21) Appl. No.: 15/400,307

(22) Filed: Jan. 6, 2017

(65) Prior Publication Data

US 2017/0242257 A1    Aug. 24, 2017

(30) Foreign Application Priority Data

Feb. 19, 2016   (JP) .................................. 2016-030158

(51) Int. Cl.
*G02B 27/01*   (2006.01)

(52) U.S. Cl.
CPC ..... *G02B 27/0179* (2013.01); *G02B 27/0101* (2013.01); *G02B 27/0149* (2013.01); *G02B 2027/0141* (2013.01); *G02B 2027/0154* (2013.01)

(58) Field of Classification Search
CPC ............ G02B 27/0179; G02B 27/0181; G02B 27/0149; G02B 27/015; G02B 27/01; G02B 27/0101; G02B 27/0006; G02B 2027/0141; G02B 2027/0154; G02B 2027/0159; G02B 2027/0161; G02B 2027/0169
USPC ......................................... 359/630
See application file for complete search history.

(56) References Cited

U.S. PATENT DOCUMENTS

| | | | |
|---|---|---|---|
| 9,063,329 B2 | 6/2015 | Jeon et al. | |
| 2008/0285138 A1* | 11/2008 | Lebreton | B60K 35/00 359/630 |
| 2010/0046082 A1* | 2/2010 | Croy | B60K 35/00 359/632 |
| 2015/0070771 A1* | 3/2015 | Jeon | G02B 27/0149 359/630 |
| 2018/0201204 A1* | 7/2018 | Saitou | B60K 35/00 |

FOREIGN PATENT DOCUMENTS

| | | |
|---|---|---|
| EP | 2 851 233 A1 | 3/2015 |
| JP | 2012-254707 | 12/2012 |
| JP | 2014201104 A | 10/2014 |

OTHER PUBLICATIONS

Extended European Search Report for related application No. 16206329.1, dated Jul. 7, 2017 (7 pgs).

* cited by examiner

*Primary Examiner* — Marin Pichler
(74) *Attorney, Agent, or Firm* — Knobbe Martens Olson & Bear LLP

(57) ABSTRACT

An HUD apparatus is structured such that a first cover moves forward to open a first opening, which is disposed on a path along which a combiner moves, and a second cover also moves forward to open a second opening, which is disposed on an optical path from a light-projecting portion of a light-emitting unit (second mirror) to the combiner. When the combiner moves from an accommodated position to a projecting position, a front end portion of the second cover moves into a space that is occupied by the combiner when the combiner is at the accommodated position.

2 Claims, 14 Drawing Sheets

HEAD-UP DISPLAY APPARATUS

RELATED APPLICATION

The present application claims priority to Japanese Patent Application Number 2016-030158, filed Feb. 19, 2016, the entirety of which is hereby incorporated by reference.

BACKGROUND

1. Field

The present disclosure relates to a head-up display apparatus that displays vehicle information or navigation information to a driver by using a combiner.

2. Description of the Related Art

A known head-up display apparatus (hereinafter referred to as an HUD apparatus) includes a combiner and a light-emitting unit that are accommodated behind a dashboard. When the HUD apparatus is in use, the combiner is disposed so as to project from the top surface of the dashboard, and is illuminated with display light emitted from the light-emitting unit, so that a virtual image is displayed on the combiner, with the combiner arranged to be closer to the driver than the windshield is.

Japanese Unexamined Patent Application Publication No. 2012-254707 discloses an example of such a HUD apparatus. In this apparatus, a casing that houses a combiner and a light-emitting unit includes a top surface having an opening that enables the combiner to move out of and into the casing. When the apparatus is not in use, the opening is closed by two covers. When the apparatus is in use, the two covers are rotated in the opposite directions, that is, forward (toward a windshield) and rearward (toward a driver), and are accommodated in the casing, so that the opening opens. The combiner is moved so as to project upward from the casing through the opening. In this state, the combiner is illuminated with display light from the light-emitting unit through the opening.

In the HUD apparatus having the above-described structure, the two covers rotate in the opposite directions, that is, forward and rearward, to open the opening. Therefore, the operation of moving the two covers into the casing to open the opening and the operation of moving the combiner out of the casing so that the combiner projects upward through the opening can be performed simultaneously. Thus, when the apparatus is to be used, the combiner can be moved out of the casing so as to project upward in a short time.

However, the HUD apparatus disclosed in Japanese Unexamined Patent Application Publication No. 2012-254707 has a problem that the overall size of the apparatus is large in the front-rear direction because one of the covers that closes a portion the opening through which the combiner passes needs to be retracted forward, and the other one of the covers that covers a portion of the opening through which the display light passes needs to be retracted rearward. In addition, since the cover that has rotated rearward to open the opening is accommodated in the casing, the design flexibility of the lower rear section of the casing is considerably reduced. Furthermore, the cover interferes with the installation space for instruments, such as a speedometer, that are disposed in front of the driver's seat.

SUMMARY

The present disclosure has been made in light of the above-described problems of the related art, and an object of the present disclosure is to provide a head-up display apparatus that can be reduced in overall size in the front-rear direction, in which the design flexibility of the lower rear section can be increased, and in which interference with other instruments can be prevented.

To achieve the above-described object, a head-up display apparatus according to the present disclosure includes a casing including a top surface in which a first opening and a second opening are formed continuously from a front side toward a rear side; a combiner capable of moving between an accommodated position in the casing and a projecting position at which the combiner projects upward through the first opening; a light-emitting unit that illuminates the combiner at the projecting position with display light from a light-projecting portion, which is disposed in the casing, through the second opening; a first cover capable of opening and closing the first opening; a second cover capable of opening and closing the second opening; and drive means that operates the combiner, the first cover, and the second cover. The first cover is capable of retracting into the casing by moving forward from a closing position at which the first cover closes the first opening. The second cover is capable of retracting into the casing by moving forward from a closing position at which the second cover closes the second opening, and is accommodated in the casing so that at least a portion of the second cover overlaps a space that is occupied by the combiner when the combiner is at the accommodated position.

In the head-up display apparatus having the above-described structure, the first cover moves forward to open the first opening, which is disposed on the path along which the combiner moves, and the second cover also moves forward to open the second opening, which is disposed on the optical path from the light-projecting portion of the light-emitting unit to the combiner. Since the accommodation space for the combiner is used, the position at which the second cover is accommodated in the casing can be shifted forward. Therefore, the overall size of the apparatus can be reduced in the front-rear direction. In addition, the design flexibility of the lower rear section can be increased and interference with other devices can be prevented.

In the above-described structure, preferably, a pair of guide members that support the combiner in a movable manner are provided in the casing, and a width W2 of the second cover in a left-right direction is smaller than a distance W1 between the pair of guide members in a direction in which the pair of guide members face each other. In such a case, interference between the second cover that has retracted into the casing and the guide members can be prevented.

In this case, a support member may be fixed to a bottom end portion of the combiner, and a pair of legs that project from left and right end portions of the support member may be movably supported by the pair of guide members. In such a case, the combiner can be reliably moved between the accommodated position and the projecting position. When the width W2 of the second cover in the left-right direction is smaller than a distance between the pair of legs in the left-right direction, interference between the second cover and the pair of legs can be prevented.

According to the head-up display apparatus of the present disclosure, the overall size of the apparatus in the front-rear direction can be reduced. In addition, the design flexibility of the lower rear section can be increased, and interference with other devices can be prevented.

DESCRIPTION OF THE PREFERRED EMBODIMENTS

Figure 1:
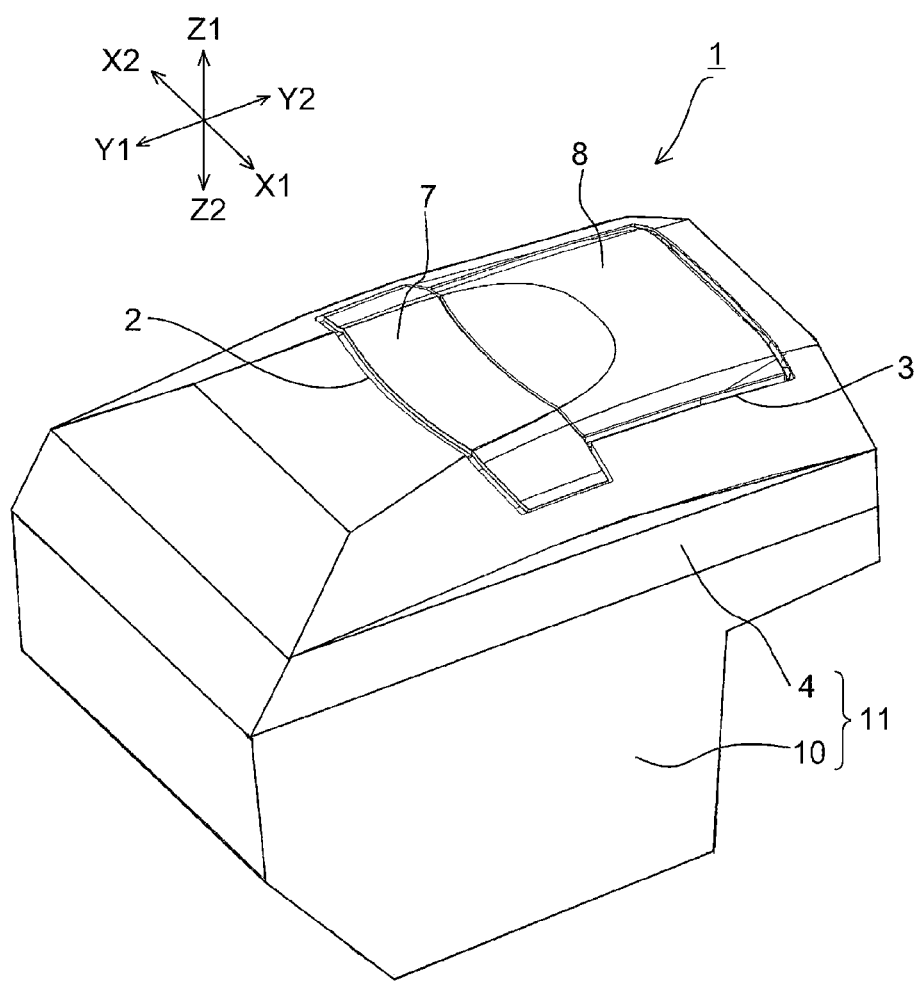
FIG. 1 is a perspective view of a head-up display apparatus according to an embodiment of the present disclosure in an unused state.

An embodiment of the present disclosure will be described with reference to the drawings. A head-up display apparatus 1 (hereinafter referred to as HUD apparatus 1) according to the present embodiment is disposed on a dashboard in front of the driver's seat in a vehicle cabin. The HUD apparatus 1 is a display apparatus that displays, for example, vehicle information or navigation information. In the following description, the direction indicated by arrow Y1-Y2 in FIG. 1 is defined as the front-rear direction, the direction indicated by arrow X1-X2 as the left-right direction, and the direction indicated by arrow Z1-Z2 as the vertical direction.

The HUD apparatus 1 includes an upper case 4 including a top surface having first and second openings 2 and 3; a combiner 5 that is accommodated in the upper case 4 and capable of projecting upward through the first opening 2; a light-emitting unit 6 that is accommodated in the upper case 4 and capable of emitting display light to the outside through the second opening 3; a first cover 7 capable of opening and closing the first opening 2; a second cover 8 capable of opening and closing the second opening 3; and a driving mechanism 9 that operates the combiner 5, the first cover 7, and the second cover 8. The HUD apparatus 1 is a pop-up apparatus in which the combiner 5 is accommodated in the upper case 4 in an unused state and is moved out of the upper case 4 so as to project upward in a used state.

Figure 5:
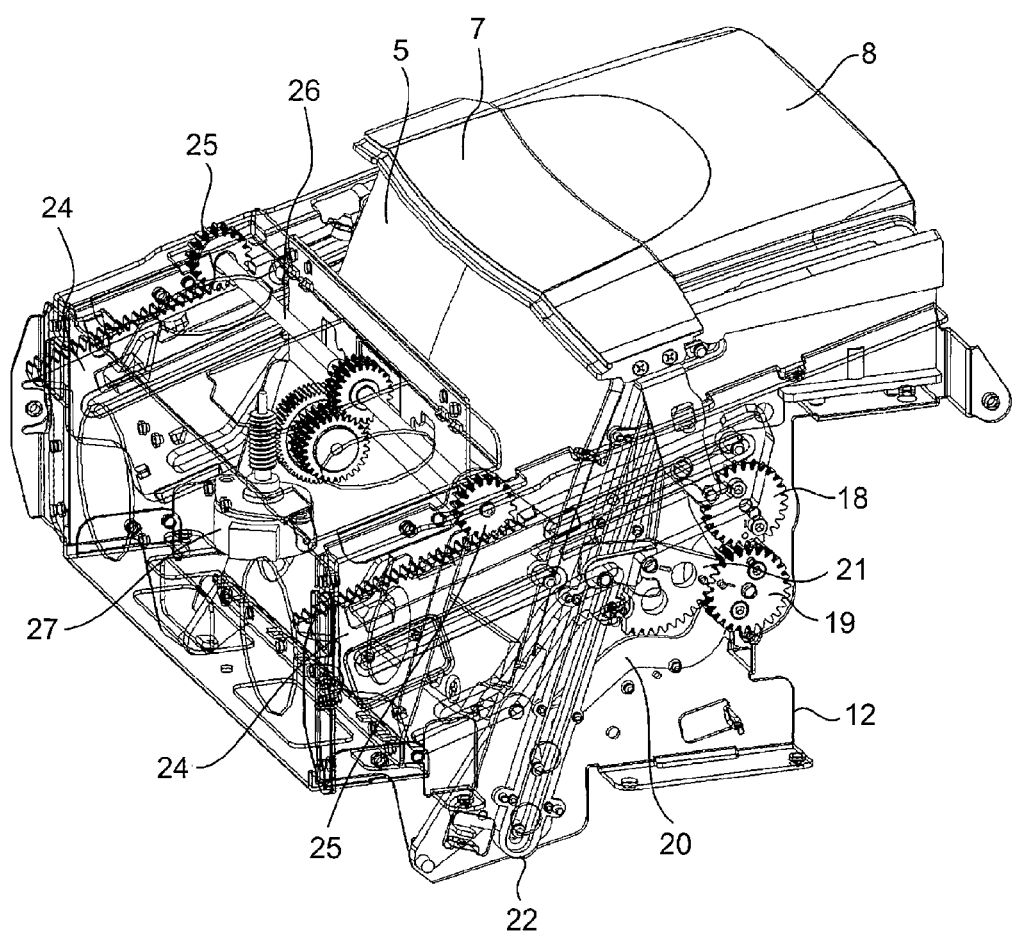
FIG. 5 is a perspective view of the head-up display apparatus illustrated in FIG. 1 from which a casing is removed.

The upper case 4 is combined with a lower case 10 to form a hollow casing 11. As illustrated in FIG. 5, a housing-shaped chassis 12 is disposed in the casing 11. The casing 11 is disposed in a recess formed in the dashboard in such a manner that the top surface of the upper case 4 is exposed. The casing 11 is oriented so that the second opening 3 faces the driver's seat and the first opening 2 faces the front (windshield).

The first opening 2 is disposed on the path along which the combiner 5 moves. The second opening 3 is disposed on the optical path from a light-projecting portion of the light-emitting unit 6, which will be described below, to the combiner 5 in a projecting state. The first opening 2 and the second opening 3 are rectangular cuts having a common side that are formed continuously from the front side toward the rear side. The first opening 2 has an elongated shape such that the length thereof in the left-right direction is much longer than the length thereof in the front-rear direction. The length of the second opening 3 in the left-right direction is somewhat shorter than that of the first opening 2.

Figure 6:
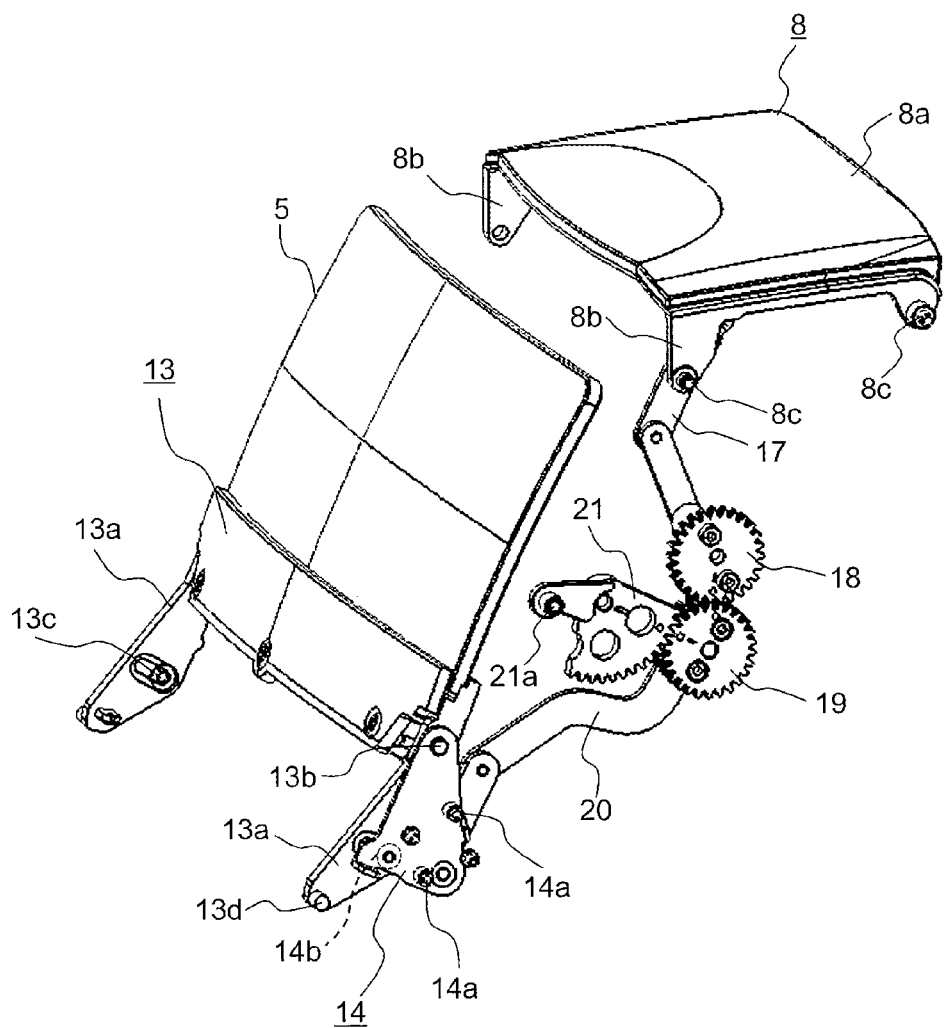
FIG. 6 is a perspective view illustrating the main parts of a combiner and an opening-closing mechanism for a second cover included in the head-up display apparatus.
Figure 7:
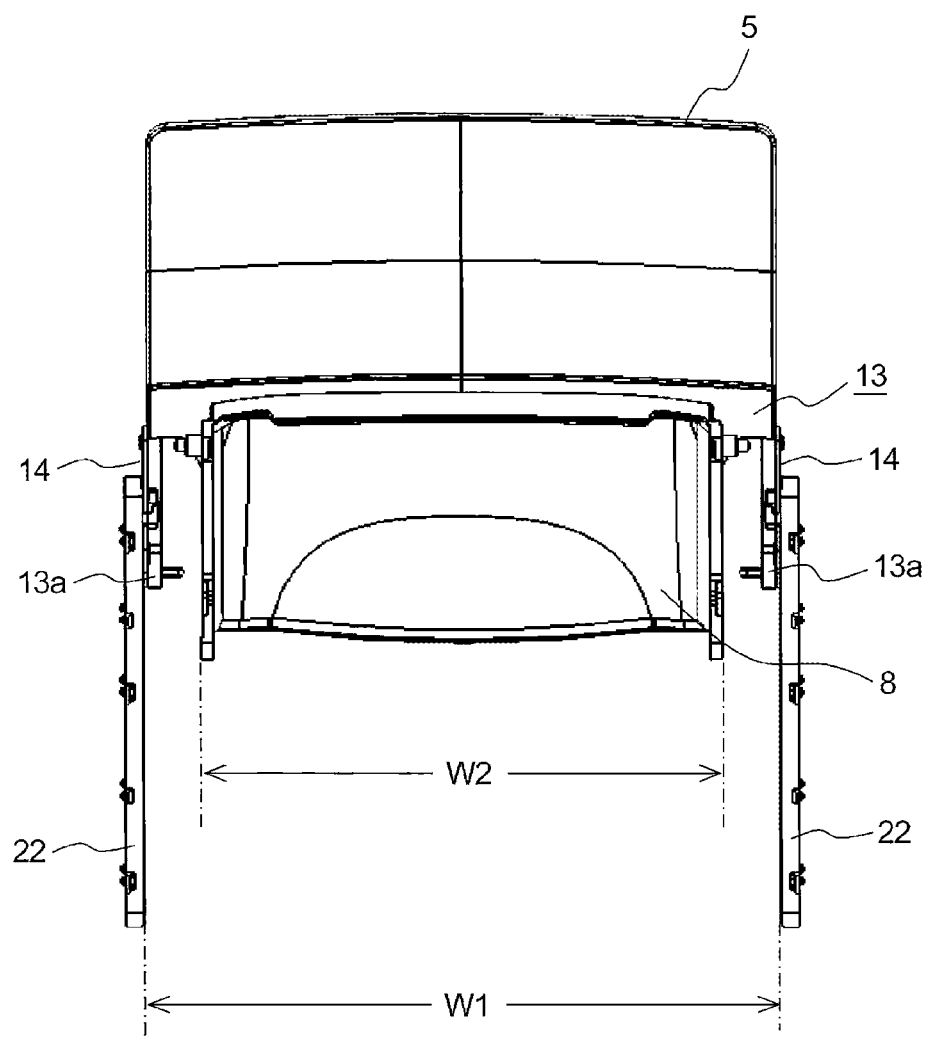
FIG. 7 is a diagram illustrating the relationship between a guide mechanism of the combiner and the second cover.
Figure 8:
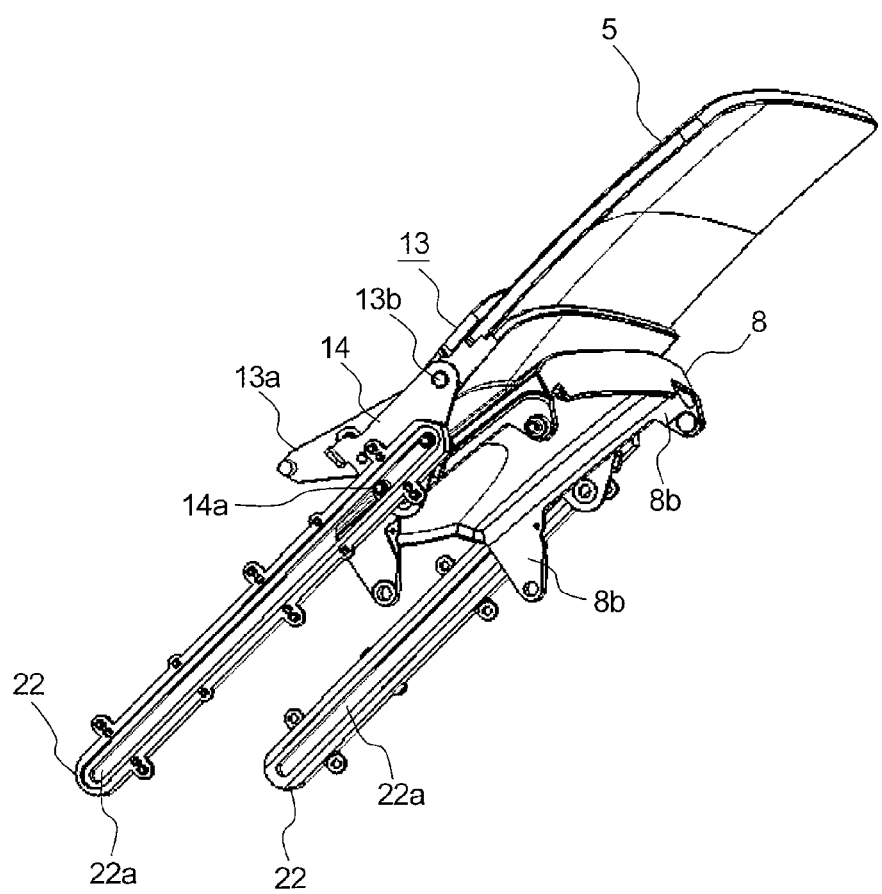
FIG. 8 is a perspective view illustrating the relationship between the guide mechanism of the combiner and the second cover.

The combiner 5 is a display panel unit including a half mirror, and has the shape of a transparent rectangular plate that is gradually curved toward the front. As illustrated in FIGS. 6 to 8, a support member 13 is fixed to the bottom portion of the combiner 5, and legs 13a project from the left and right end portions of the support member 13. Each leg 13a includes a shaft 13b, a long hole 13c, and a projection 13d, and an operation plate 14 is rotatably connected to the shaft 13b. A pair of guide pins 14a are provided on the outer surface of the operation plate 14, and a connecting pin 14b is provided on the inner surface of the operation plate 14. The connecting pin 14b is inserted in the long hole 13c in the leg 13a in a movable manner, and the relative angle between the support member 13 and the operation plate 14 is regulated within a range in which the connecting pin 14b is movable in the long hole 13c.

Figure 2:
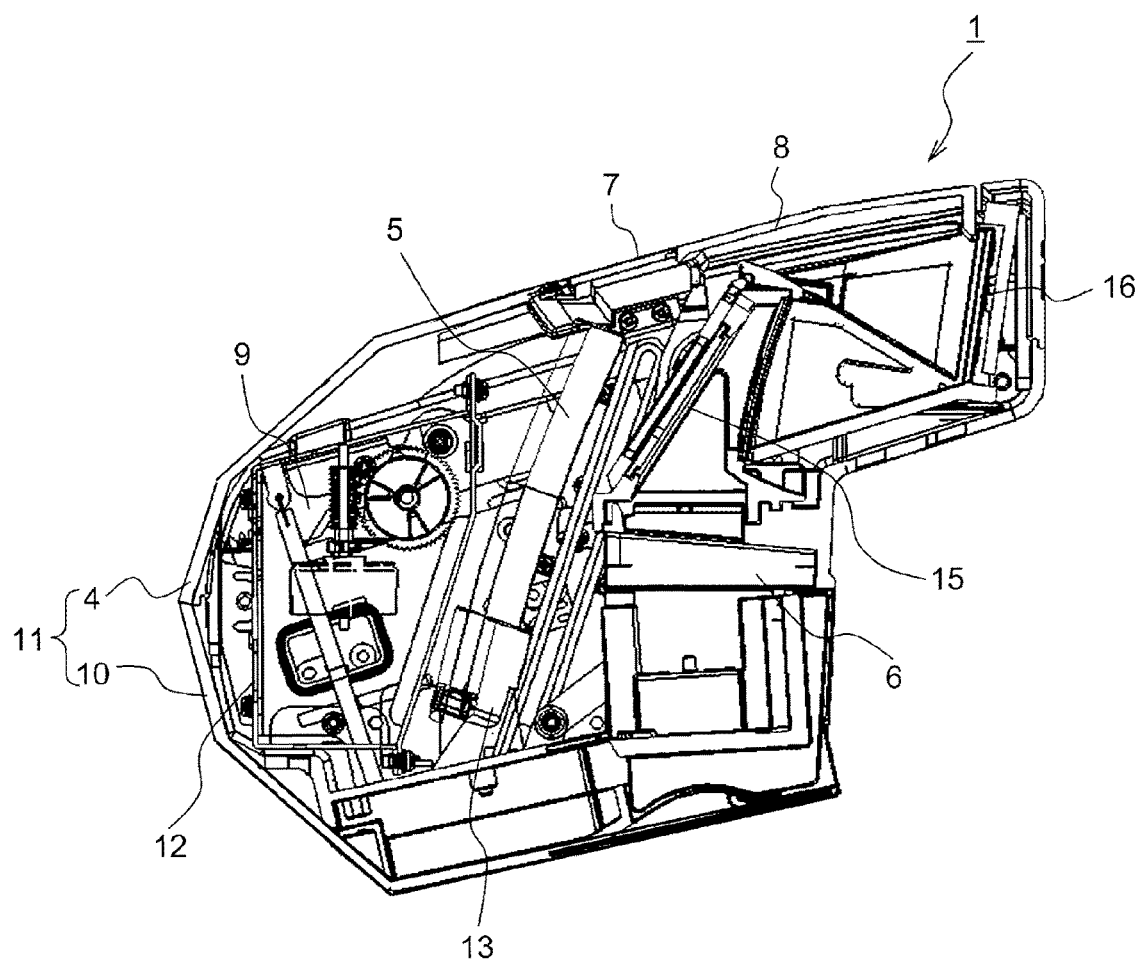
FIG. 2 is a sectional view of the head-up display apparatus in the unused state.

As illustrated in FIG. 2, the light-emitting unit 6 is disposed in a lower rear section of the chassis 12. The display light emitted from the light-emitting unit 6 is reflected by a first mirror 15, which is disposed in front of and below the second opening 3, and travels toward a second mirror 16, which is disposed behind and below the second opening 3. The second mirror 16 corresponds to the light-projecting portion of the light-emitting unit 6. As described in detail below, referring to FIG. 4, when the combiner 5 is at the projecting position, the display light from the light-emitting unit 6 reflected by the second mirror 16 (light-projecting portion) passes through the second opening 3 and reaches the combiner 5.

Figure 9:
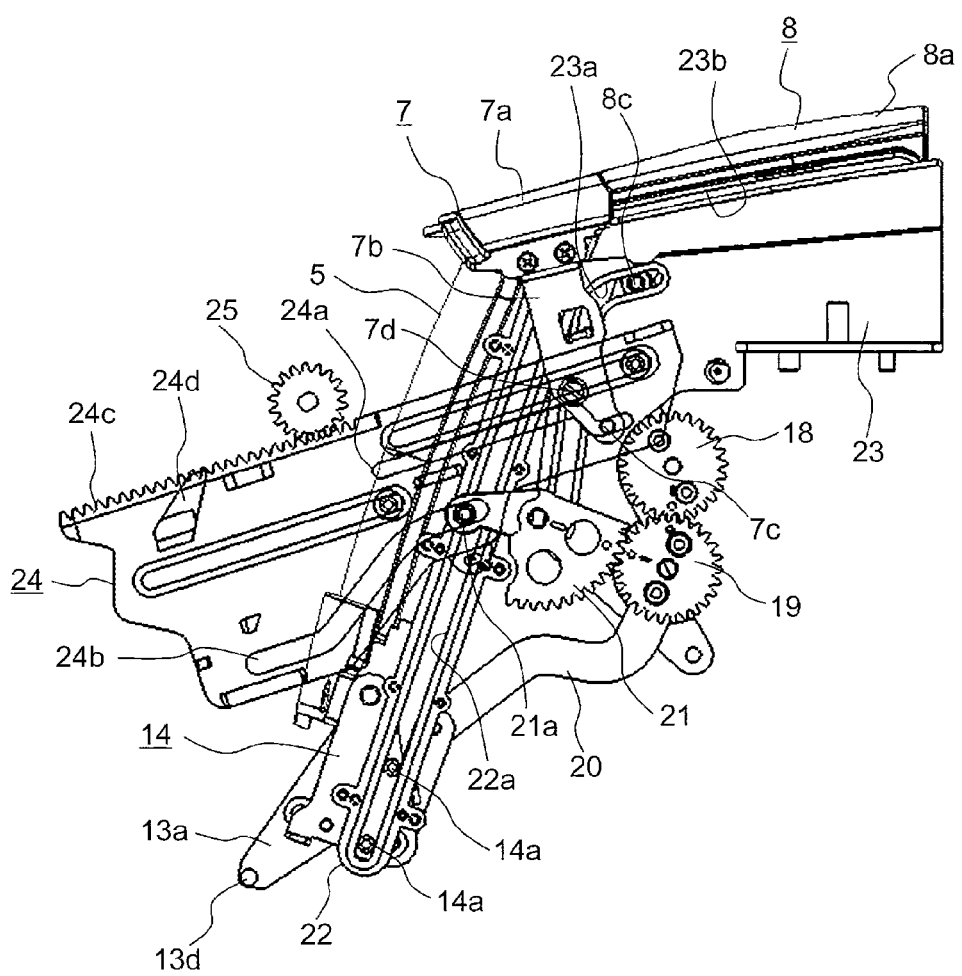
FIG. 9 is a diagram illustrating the main part of a driving mechanism included in the head-up display apparatus.

As illustrated in FIG. 9, the first cover 7 includes a lid 7a having substantially the same shape as the first opening 2. Legs 7b project from the left and right end portions of the lid 7a, and each leg 7b has a guide pin 7c at the distal end thereof. The first cover 7 is supported by the chassis 12 so as to be rotatable around a shaft 7d provided on each leg 7b. The guide pin 7c is inserted in a cam hole formed in a corresponding one of drive plates, which will be described below.

As illustrated in FIG. 6, the second cover 8 includes a lid 8a having substantially the same shape as the second opening 3. Four guide pins 8c are provided on legs 8b that project from four corners of the lid 8a. Link arms 17 are rotatably connected to the front legs 8b of the second cover 8. Each link arm 17 is fixed to a relay gear 18 having a shaft that is supported by a side portion of the chassis 12. Another relay gear 19 meshes with the relay gear 18. A link arm 20, which is fixed to the relay gear 19, is rotatably connected to the corresponding operation plate 14. In addition, a sector gear 21 meshes with the relay gear 19, and a guide pin 21a is provided on the sector gear 21.

Referring to FIG. 9, a pair of first guide members 22 and a pair of second guide members 23 are attached to left and right side portions of the chassis 12. Each first guide member 22 has a guide hole 22a that extends obliquely, and the guide pins 14a on the corresponding operation plate 14 are inserted in the guide hole 22a. Accordingly, the combiner 5, the support member 13, and the operation plates 14 are movably supported by the first guide members 22. As illustrated in FIG. 7, the width W2 of the second cover 8 in the left-right direction is smaller than the distance W1 between the pair of first guide members 22 in the direction in which the first guide members 22 face each other. As described in detail below, the second cover 8 retracts into the casing 11 through the space between the pair of first guide members 22, which support the combiner 5 in a movable manner. The width W2 of the second cover 8 in the left-right direction is set so as to be smaller than the distance between the pair of legs 13a, which project from the support member 13, in the left-right direction.

A pair of guide holes 23a and 23b are formed in each of the second guide members 23. Each of the front guide pins 8c of the second cover 8 is inserted in the corresponding guide hole 23a in a movable manner, and each of the rear guide pins 8c of the second cover 8 is inserted in the corresponding guide hole 23b in a movable manner.

Drive plates 24 are supported by the left and right side portions of the chassis 12 so as to be movable in the front-rear direction. The drive plates 24 are disposed at the sides of the combiner 5 so as to extend from the front side toward the rear side of the accommodated position of the combiner 5. Each drive plate 24 has two cam holes 24a and 24b. The guide pins 7c at the distal ends of the legs 7b of the first cover 7 are inserted in the upper cam holes 24a in a movable manner, and the guide pins 21a on the sector gears 21 are inserted in the lower cam holes 24b in a movable manner.

Accordingly, when the drive plates 24 move in the front-rear direction, the guide pins 7c slide along the upper cam holes 24a, so that the first cover 7 rotates around the shafts 7d, thereby opening or closing the first opening 2. In addition, when the drive plates 24 move in the front-rear direction, the guide pins 21a of the sector gears 21 move along the lower cam holes 24b. As each sector gear 21 rotates, the two corresponding relay gears 18 and 19 rotate in the opposite directions. The rotation of one relay gear 18 is transmitted to the second cover 8 through the corresponding link arm 17, so that the corresponding guide pins 8c of the second cover 8 move along the guide holes 23a and 23b in the corresponding second guide member 23. Accordingly, the second cover 8 rotates to open or close the second opening 3. At the same time, the rotation of the other relay gear 19 is transmitted to the corresponding operation plate 14 through the corresponding link arm 20, so that the guide pins 14a on the operation plate 14 slide along the guide hole 22a in the corresponding first guide member 22. Accordingly, the operation plates 14 and the support member 13 move together along the guide holes 22a so that the combiner 5 held by the support member 13 is moved between the inside of the casing 11 and the outside of the first opening 2.

Racks 24c are formed on the top surfaces of the drive plates 24, and gears 25 mesh with the racks 24c. As illustrated in FIG. 5, the gears 25 are fixed to a synchronizing shaft 26, which extends in the left-right direction of the chassis 12, at both ends of the synchronizing shaft 26. When the synchronizing shaft 26 is rotated by a motor 27, which is disposed in a lower front section of the chassis 12 and serves as a drive source, the pair of left and right drive plates 24 move in the front-rear direction. Pressing projections 24d are formed on upper portions of the drive plates 24. As described in detail below, when the drive plates 24 are further moved after the completion of the operation of raising the combiner 5, the pressing projections 24d come into contact with the projections 13d and rotate the support member 13 so that the combiner 5 is tilted. The motor 27, the gears 25, the drive plates 24, the sector gears 21, the relay gears 18 and 19, the link arms 17 and 20, the operation plates 14, and other components constitute a driving mechanism 9 (driving means) for operating the combiner 5, the first cover 7, and the second cover 8. The drive plates 24, the sector gears 21, the relay gears 18, the link arms 17, and other components constitute a transmission mechanism that transmits the power of the motor 27 to the second cover 8.

The operation of raising the combiner 5 in the HUD apparatus 1 structured as described above will be described with reference to FIGS. 10 to 14.

Figure 10:
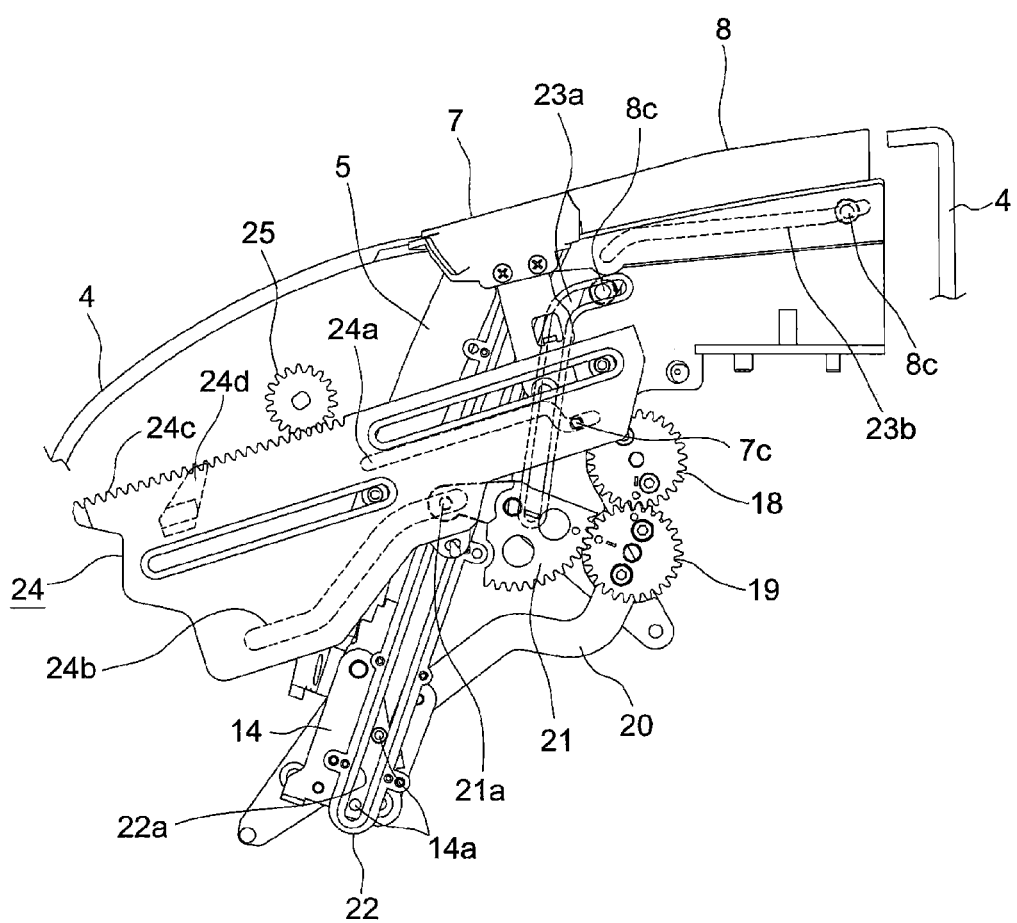
FIG. 10 is a diagram illustrating the state in which the combiner is accommodated.

FIGS. 1 and 2 illustrate the HUD apparatus 1 in an unused state. In the unused state, the first opening 2 and the second opening 3 formed in the top surface of the upper case 4 are respectively closed by the first cover 7 and the second cover 8, and the combiner 5 is retained at an accommodated position in the casing 11. In this state, as illustrated in FIG. 10, each drive plate 24 is stationary at an advance position, which is at the left end in FIG. 10. The guide pin 7c of the first cover 7 engages with a right end portion of the upper cam hole 24a in FIG. 10, and the guide pin 21a of the sector gear 21 engages with a right end portion of the lower cam hole 24b in FIG. 10. The guide pins 14a of the operation plate 14 engage with a bottom end portion of the guide hole 22a in the first guide member 22, and the combiner 5 is stationary at the accommodated position at the bottom.

Figure 11:
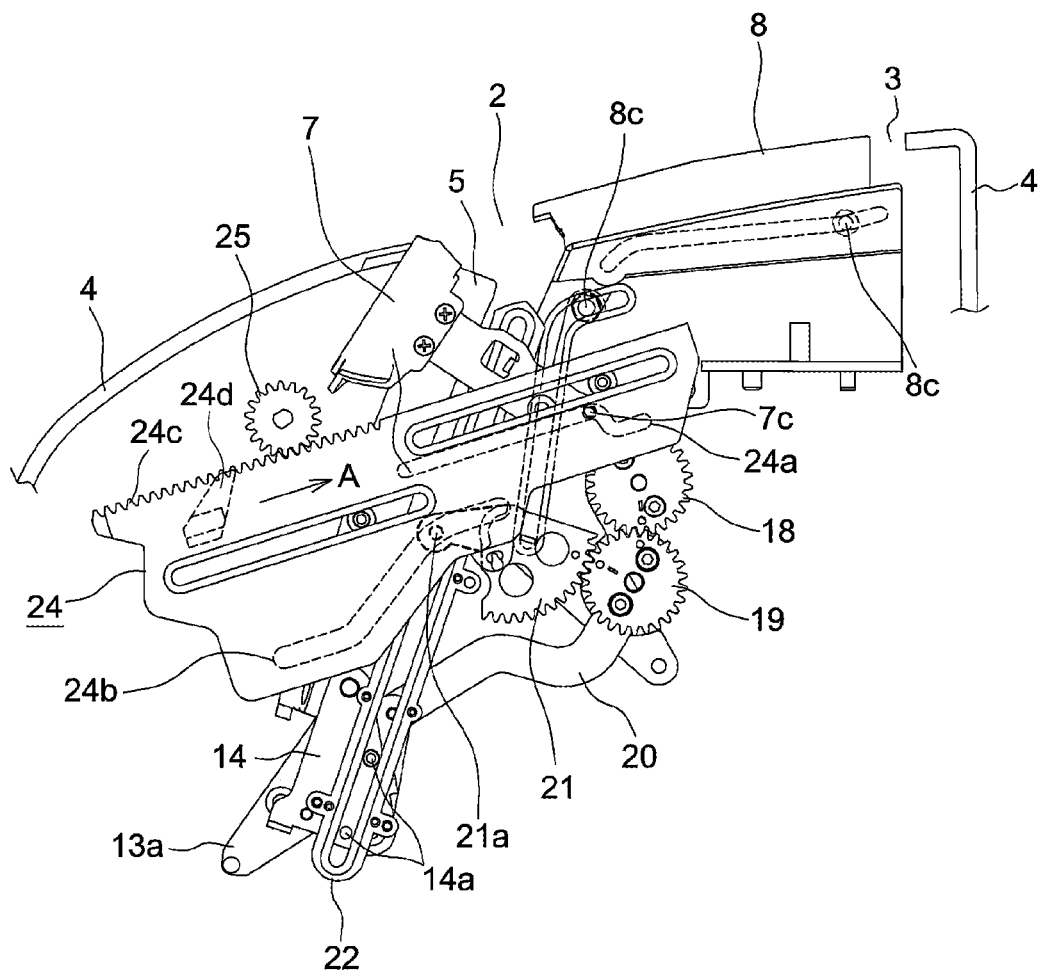
FIG. 11 is a diagram illustrating the state in which an operation of raising the combiner is started.

When the motor 27 is rotated in the forward or reverse direction in this state, the rotation of the motor 27 is transmitted to the gear 25 through the synchronizing shaft 26. Accordingly, the drive plate 24 starts to move rightward (direction of arrow A) in FIG. 11 from the advance position toward a retreat position. As a result, as illustrated in FIG. 11, the guide pin 7c of the first cover 7 moves to an inclined portion of the upper cam hole 24a, so that the first cover 7 rotates forward around the shaft 7d and is accommodated in the upper case 4. Accordingly, the first opening 2 opens.

In addition, when the drive plate 24 starts to move toward the retreat position as described above, the guide pin 21a of the sector gear 21 moves to an inclined portion of the lower cam hole 24b. Accordingly, the sector gear 21 rotates counterclockwise in FIG. 11 so that the pair of relay gears 18 and 19 rotate in the opposite directions. As a result, the movement of the link arm 20, which is fixed to the relay gear 19, is transmitted to the operation plate 14, and the guide pins 14a of the operation plate 14 move upward from the bottom end portion of the guide hole 22a in the first guide member 22. Accordingly, the operation plate 14 and the leg 13a of the support member 13 move upward together, and the combiner 5 supported by the support member 13 starts to move upward from the accommodated position toward the first opening 2. At the same time, the movement of the link arm 17, which is fixed to the relay gear 18, is transmitted to the second cover 8, and the guide pins 8c of the second cover 8 move leftward from the right end portions of the guide holes 23a and 23b in the second guide member 23 in FIG. 11. Accordingly, the second cover 8 moves into the upper case 4 while rotating forward, and the rear end portion of the second opening 3 gradually opens.

Figure 12:
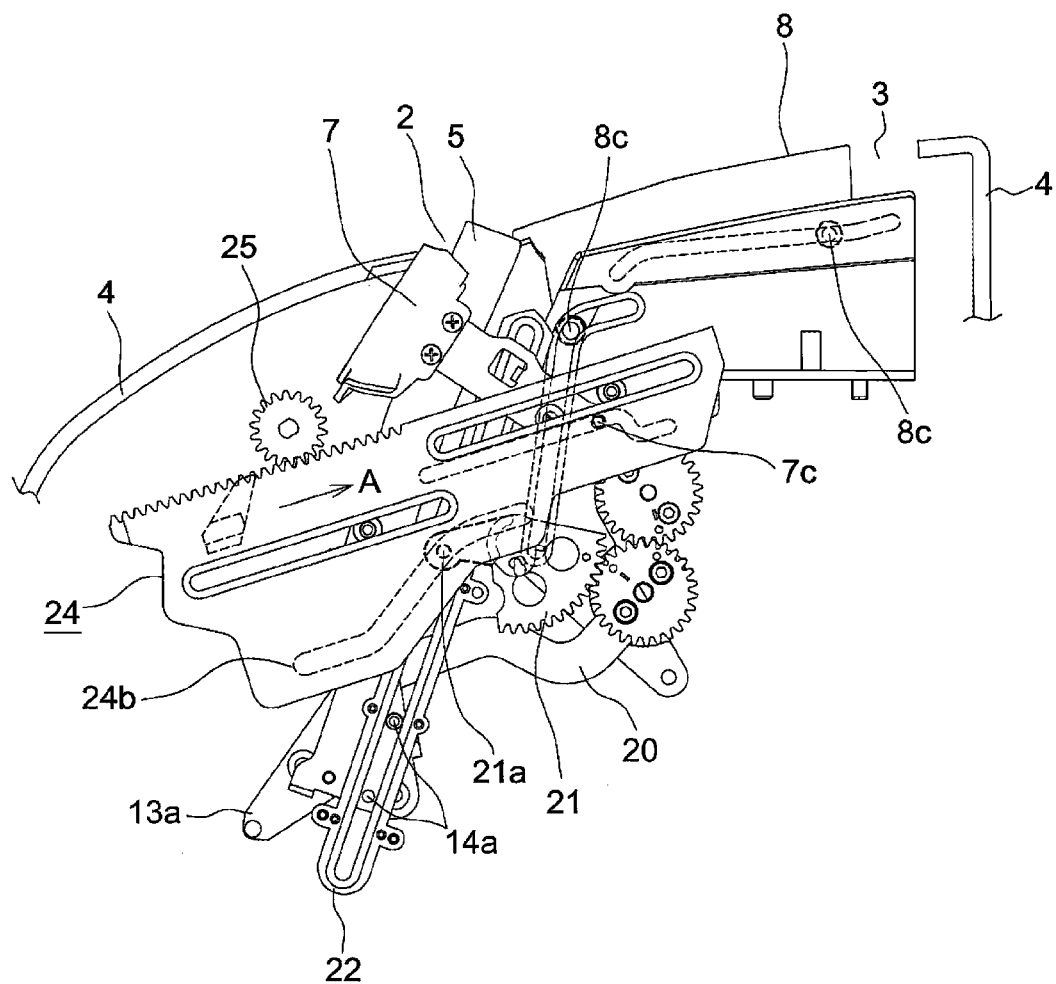
FIG. 12 is a diagram illustrating the state in which the operation of raising the combiner is being performed.
Figure 13:
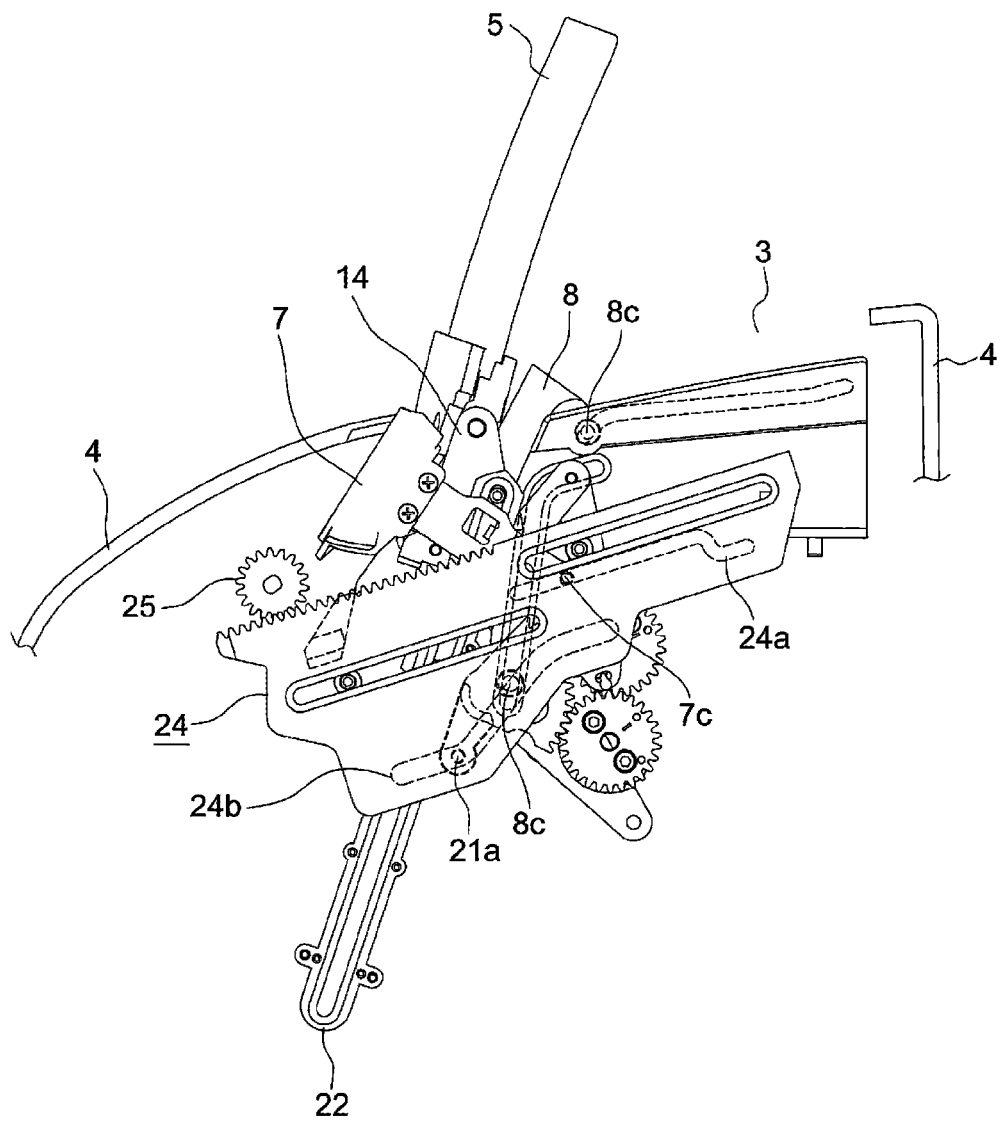
FIG. 13 is a diagram illustrating the state in which the operation of raising the combiner is completed.

When the drive plate 24 further moves toward the retreat position, as illustrated in FIG. 12, the combiner 5 starts to project upward from the upper case 4 through the first opening 2, and the second cover 8 moves into the upper case 4. At this time, since the width W2 of the second cover 8 in the left-right direction is smaller than the distance W1 between the pair of first guide members 22 in the direction in which the first guide members 22 face each other (see FIG. 7), the second cover 8 moves into the casing 11 through the space between the pair of first guide members 22. When the motor 27 is stopped at the time when the drive plate 24 reaches the retreat position, as illustrated in FIG. 13, the combiner 5 is retained at a position where the entirety thereof projects from the first opening 2, and the second cover 8 is accommodated in the upper case 4 so that the second opening 3 is fully open. At this time, the operation of raising the combiner 5 is completed.

Figure 3:
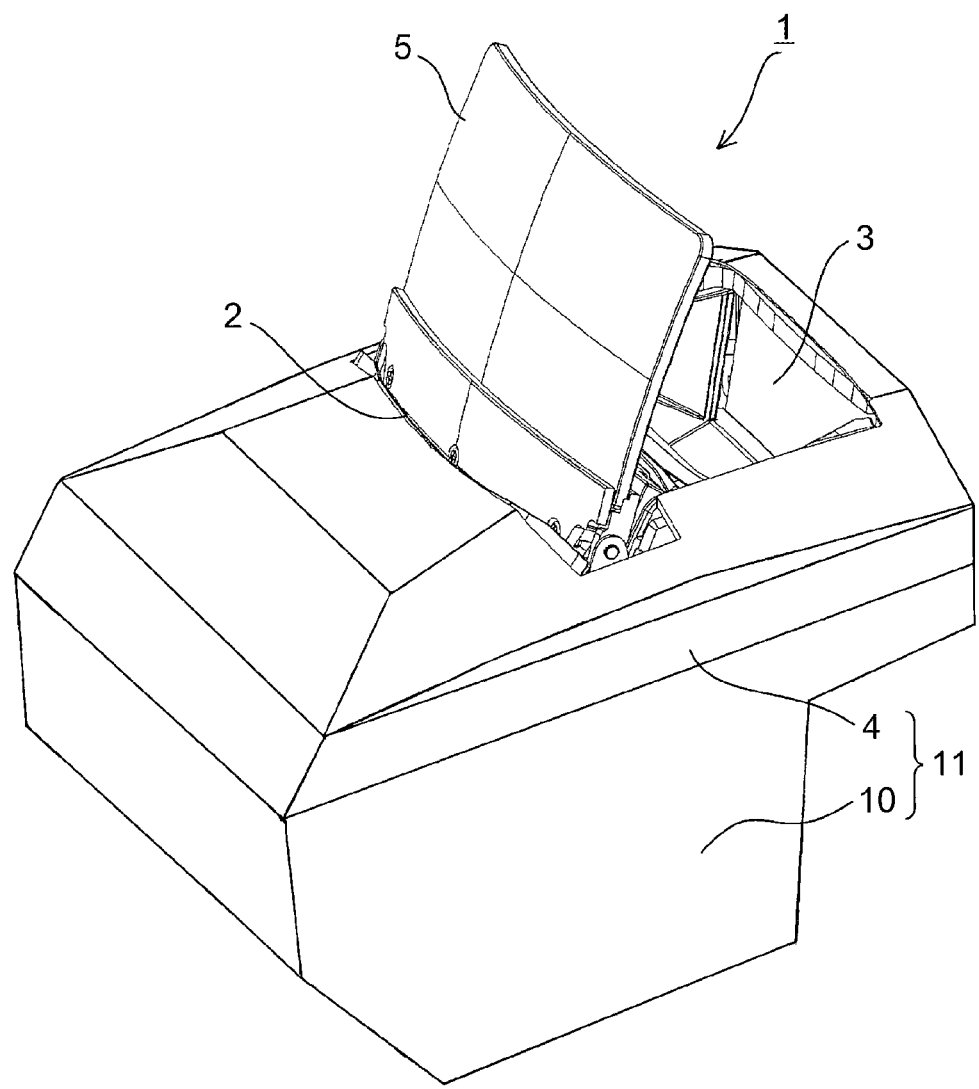
FIG. 3 is a perspective view of the head-up display apparatus in a used state.
Figure 4:
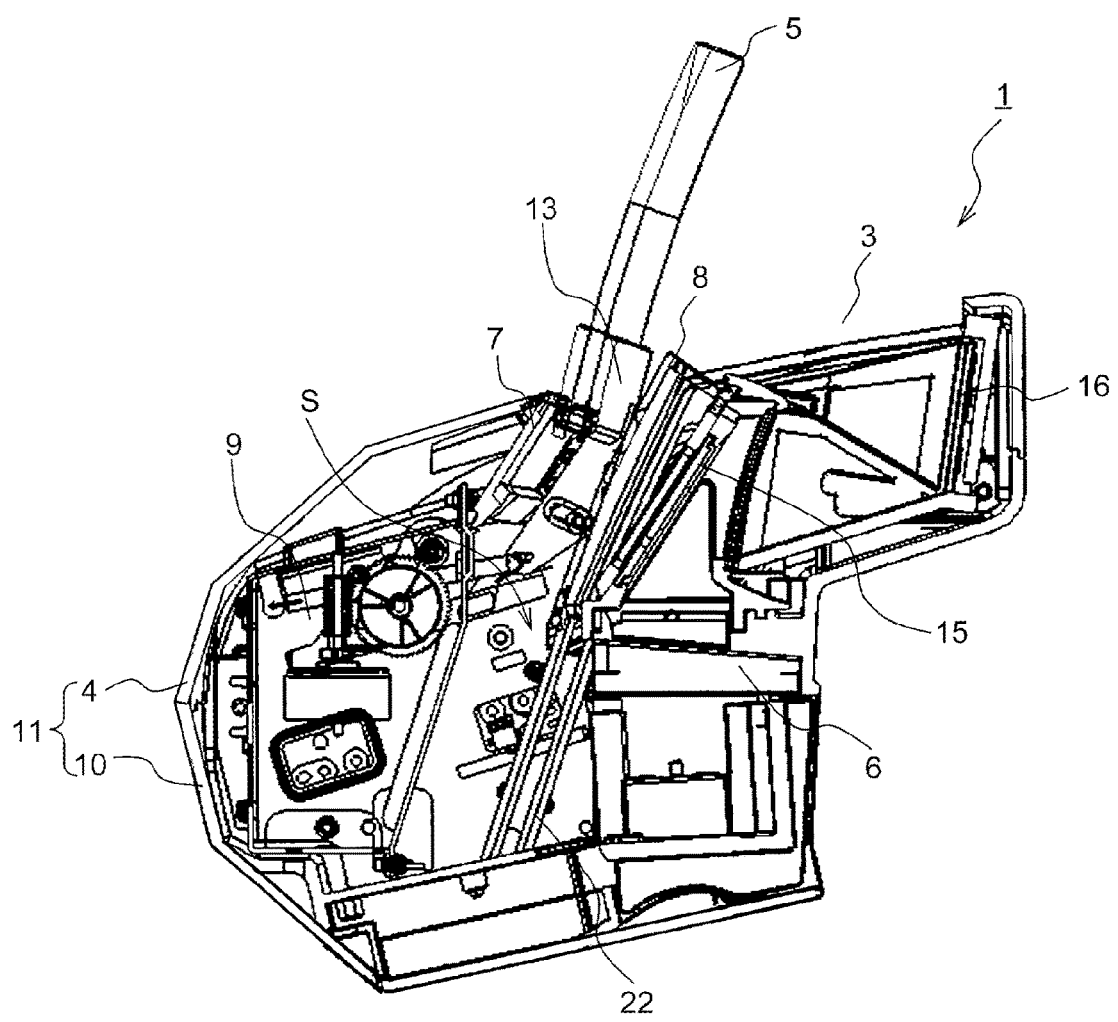
FIG. 4 is a sectional view of the head-up display apparatus in the used state.

FIGS. 3 and 4 illustrate the HUD apparatus 1 in a used state after the completion of the operation of raising the combiner 5. In the used state, when display light is emitted from the light-emitting unit 6, the display light is reflected by the first mirror 15 and the second mirror 16, passes through the second opening 3, and reaches the combiner 5. At this time, as is clear from FIG. 4, the first cover 7 is stationary at a position in front of the path along which the combiner 5 moves, and the second cover 8 is stationary in the state in which a front end portion thereof is in a space S that is occupied by the combiner 5 when the combiner 5 is at the accommodated position.

Figure 14:
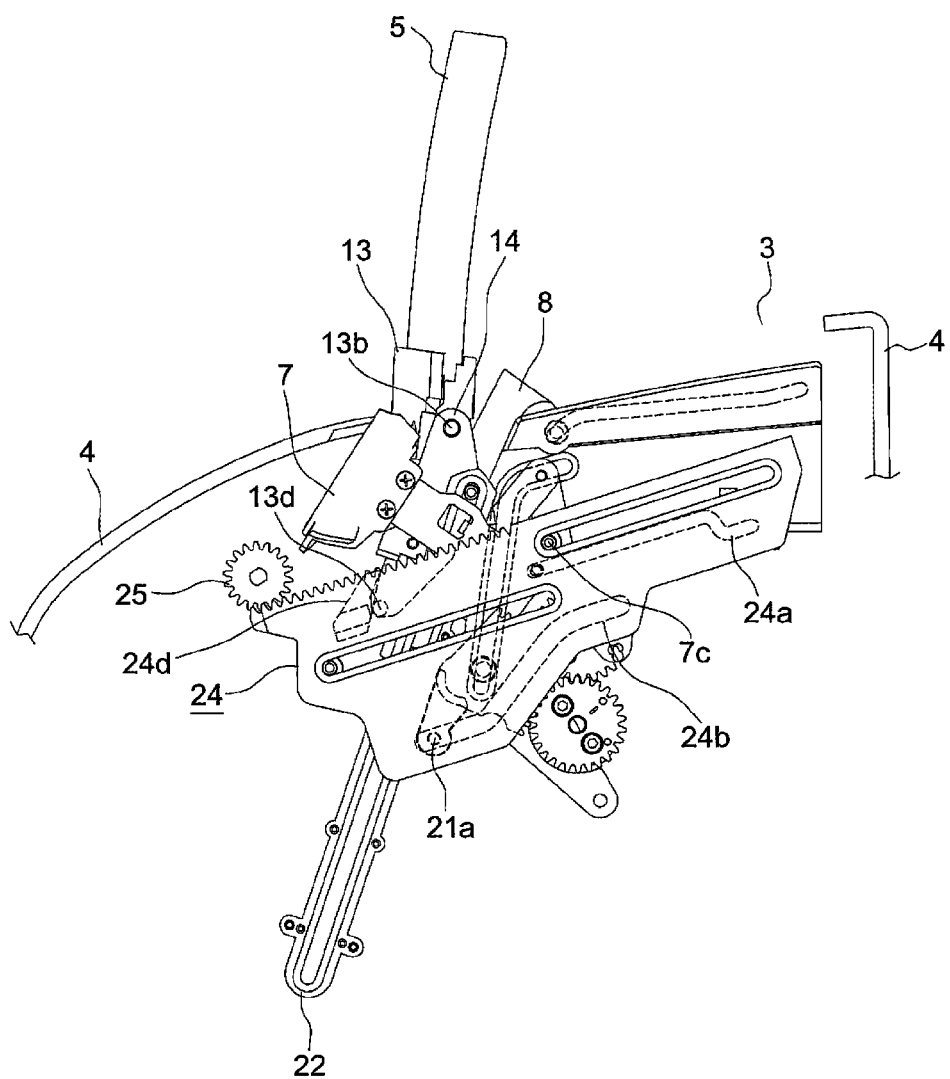
FIG. 14 is a diagram illustrating a tilting movement of the combiner.

This HUD apparatus 1 has a tilting function for adjusting the orientation of the combiner 5 retained at the projecting position. More specifically, when the drive plate 24 is moved further rightward from the retreat position illustrated in FIG. 13 after the completion of the operation of raising the combiner 5, as illustrated in FIG. 14, the pressing projection 24d of the drive plate 24 pushes the projection 13d of the support member 13. As a result, the relative angle between the support member 13 and the operation plate 14, which are connected to each other so as to be rotatable around the shaft 13b, changes. Accordingly, the combiner 5, which is integrated with the support member 13, rotates around the shaft 13b, and the orientation of the combiner 5 can be adjusted as desired by the user.

When the combiner 5 in the raised state is to be retracted to the accommodated position in the casing 11, the motor 27 is rotated in the direction opposite to that in the above-described operation, so that the drive plate 24 is moved from the retreat position illustrated in FIG. 13 to the advance position illustrated in FIG. 10.

As described above, in the HUD apparatus 1 according to the present embodiment, the first cover 7 moves forward to open the first opening 2, which is disposed on the path along which the combiner 5 moves, and the second cover 8 also moves forward to open the second opening 3, which is disposed on the optical path from the second mirror 16, that is, the light-projecting portion of the light-emitting unit 6, to the combiner 5. When the combiner 5 moves from the accommodated position to the projecting position, the front end portion of the second cover 8 moves into the space S that is occupied by the combiner 5 when the combiner 5 is at the accommodated position. Since the accommodation space for the combiner 5 is used, the position at which the second cover 8 is accommodated in the casing 11 can be shifted forward. As a result, the light-projecting portion of the light-emitting unit 6 (second mirror 16) can also be shifted forward, and the overall size of the apparatus can be reduced in the front-rear direction. In addition, it is not necessary to provide an accommodation space for the second cover 8 in a lower rear section of the casing 11. Therefore, the design flexibility of the lower rear section can be increased and interference with instruments such as a speedometer can be prevented.

In addition, in the present embodiment, the pair of first guide members 22, which support the combiner 5 in a movable manner, is provided in the casing 11, and the width W2 of the second cover 8 in the left-right direction is smaller than the distance W1 between the pair of first guide members 22 in the direction in which the first guide members 22 face each other. Therefore, interference between the second cover 8 that has retracted into the casing 11 and the first guide members 22 can be prevented. Furthermore, since the support member 13 is fixed to the bottom end portion of the combiner 5 and the pair of legs 13a that project from the left and right end portions of the support member 13 are movably supported by the first guide members 22, the combiner 5 can be reliably moved between the accommodated position and the projecting position. In addition, since the width W2 of the second cover 8 in the left-right direction is smaller than the distance between the pair of legs 13a in the left-right direction, interference between the second cover 8 and the pair of legs 13a is also prevented.

According to the above-described embodiment, the display light from the light-emitting unit 6 is reflected by the first mirror 15 and the second mirror 16, and the second mirror 16 serves as the light-projecting portion for illuminating the combiner 5 with the display light. However, the number of mirrors to be used is not limited to two. For example, the display light from the light-emitting unit 6 may be directed toward the combiner 5 by using only the second mirror 16. Alternatively, the combiner 5 may be directly illuminated with the display light emitted from the light-emitting unit 6 without using a mirror. In such a case, the light-emitting unit 6 serves as the light-projecting portion.

In the above-described embodiment, each sector gear 21, which engages with the lower cam hole 24b of the corresponding drive plate 24, rotates the corresponding pair of relay gears 18 and 19 in the opposite directions. Accordingly, the combiner 5 and the second cover 8 are moved simultaneously in response to the rotation of the relay gears 18 and 19. However, it is not necessary that the combiner 5 and the second cover 8 be moved at the same time. For example, each drive plate 24 may have a cam hole for operating the combiner 5 and a cam hole for operating the second cover 8 individually so that the second cover 8 starts to open after the combiner 5 has moved upward by a predetermined distance from the accommodated position.

What is claimed is:

1. A head-up display apparatus comprising:
   a combiner;
   a projector configured to project light beams;
   a casing comprising a first opening and a second opening;
   a first cover configured to move for opening and closing the first opening; and
   a second cover configured to move for opening and closing the second opening,
   wherein the combiner is configured to move between a first inside position inside the casing and a first outside position outside the casing through the first opening when the first opening is not closed by the first cover,
   wherein the second cover is configured to move between a second inside position inside the casing for opening the second opening and a second outside position outside the casing for closing the second opening,
   wherein the projector is located inside the casing and configured to project the light beams to the combiner via the second opening when the combiner is at the first outside position and when the second cover is at the second inside position to open the second opening,
   wherein the head-up display apparatus further comprises a first pair of guide members arranged inside the casing and apart from each other with a space therebetween, wherein, at the first inside position, the combiner is located in the space between the first pair of guide members, wherein the combiner is slidably engaged with the first pair of guide members such that the combiner is guided by the first pair of guide members when moving between the first inside position and the first outside position, wherein the head-up display apparatus further comprises a second pair of guide members arranged inside the casing, wherein the second cover is slidably engaged with the second pair of guide members such that the second cover is guided by the second pair of guide members when moving between the second inside position and the second outside position, wherein the head-up display apparatus further comprises a first gear and a second gear operably engaged with each other such that the second gear rotates as the first gear rotates, wherein the first gear is connected the combiner such that the first gear rotates as the combiner moves, wherein the second gear is connected the second cover such that the second cover moves as the second gear rotates, and further such that when the combiner moves from the first inside position to the first outside position and the first gear rotates, the second gear rotates and the second cover slides along the second pair of guide members from the second outside position to the second inside position.

2. The head-up display apparatus according to claim 1, wherein each of the first pair of guide members comprises a guide rail, wherein the combiner comprises a protrusion engaged with the guide rail of one of the first pair of guide members such that the protrusion slides along the guide rail when the combiner moves between the first inside position and the first outside position.

\* \* \* \* \*